United States Patent [19]

Anderson et al.

[11] Patent Number: 4,863,076
[45] Date of Patent: Sep. 5, 1989

[54] PARTICULATE MATERIAL FEEDER UTILIZING VIBRATION AND AERATION

[75] Inventors: Robert J. Anderson, Toledo; James E. Henry, Apple Creek; Harold M. Keener, Ashland, all of Ohio

[73] Assignee: The Ohio State University, Columbus, Ohio

[21] Appl. No.: 72,565

[22] Filed: Jul. 13, 1987

[51] Int. Cl.[4] .............................................. B65G 53/48
[52] U.S. Cl. ...................................... 222/636; 222/195; 222/216; 222/368; 222/637; 406/63
[58] Field of Search .............. 222/636, 637, 195, 197, 222/217, 368, 370, 216, 196, 161; 406/62-64, 67

[56] References Cited

U.S. PATENT DOCUMENTS

| | | | |
|---|---|---|---|
| 3,029,000 | 4/1962 | Kobee | 222/195 |
| 3,161,442 | 12/1964 | Reed | 406/63 |
| 4,025,122 | 5/1977 | Diemert | 222/197 X |
| 4,227,835 | 10/1980 | Nussbaum | 222/636 X |
| 4,681,484 | 7/1987 | Egger | 222/370 X |

FOREIGN PATENT DOCUMENTS

| | | | |
|---|---|---|---|
| 52121 | 3/1983 | Japan | 222/368 |
| 421885 | 11/1974 | U.S.S.R. | 222/197 |
| 645027 | 1/1979 | U.S.S.R. | 222/197 |
| 451562 | 8/1936 | United Kingdom | 222/368 |

Primary Examiner—Joseph J. Rolla
Assistant Examiner—Edward S. Ammeen
Attorney, Agent, or Firm—Frank H. Foster

[57] ABSTRACT

Apparatus and method for feeding particulate material from a hopper into a process stream at a controlled flow rate. A rotating wheel with spaced apart pockets is vibrated to densify the particulate material in the pockets. A stator contacts and covers a portion of the upper surface of the wheel and has a transfer station connected to discharge particular into the process stream. The wheel is driven in rotation at a controlled rate to control the particulate flow rate into the process stream. A conveying gas supply projects a jet of gas into the pockets for removing the particulate material and conveying it into the process stream. An aerating gas supply directs an upward flow of gas from the periphery of the wheel, through the particulate material being supplied to the wheel to fluidize the particulate material supplied to the wheel.

15 Claims, 3 Drawing Sheets

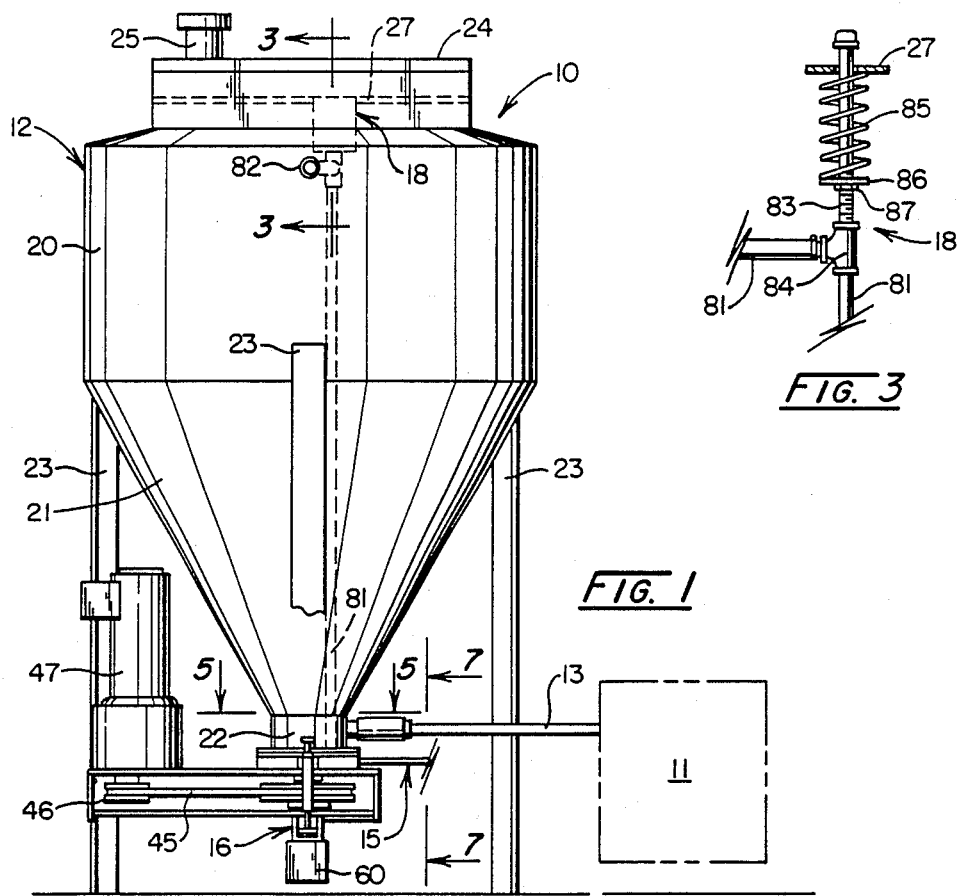
FIG. 3
FIG. 1
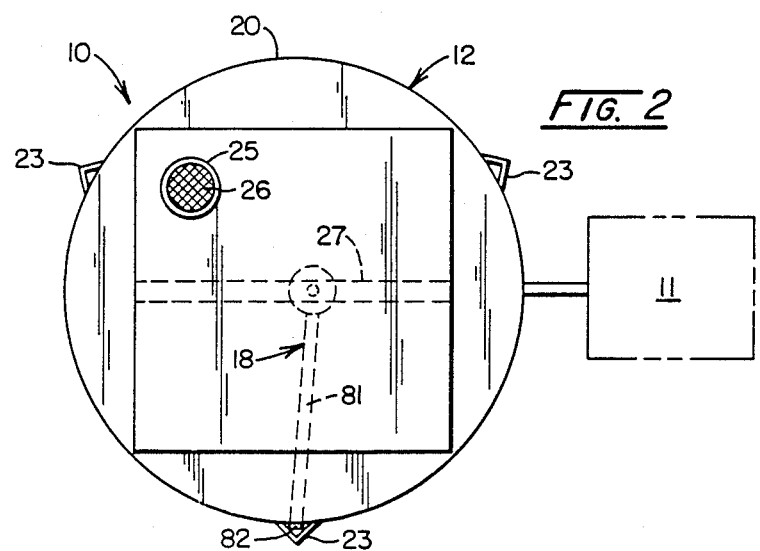
FIG. 2

PARTICULATE MATERIAL FEEDER UTILIZING VIBRATION AND AERATION

TECHNICAL FIELD

This invention relates generally to feeding particulate material, and particularly concerns apparatus and methods for volumetrically measuring and feeding caking-type particulate materials into a pressurized process zone.

BACKGROUND ART

Numerous different types of volumetric feeding apparatus and methods are known in the material handling arts. Not all the known volumetric feeding apparatus and methods are suitable, however, for processing finely divided materials which flow freely when aerated or fluidized but which tend to agglomerate or cake when subjected to long term settling or vibration. Examples of such materials include powdered coal, flour, cement, fly ash, and the like.

Further, the known types of volumetric feeding apparatus and methods are not suited to injecting the measured granular material into a pressurized process stream without requiring auxiliary equipment such as an air lock and supplementary dust collecting means to assure dust-free operation.

Also, some types of volumetric measuring and feeding apparatus such as vibratory screw feeders suitable for feeding caking-type particulate materials are comparably more costly to construct.

We have discovered that an improved volumetric measuring and feeding apparatus may be constructed in a less costly manner and also operated to provide increased repeatability or accuracy of measurement for caking-type particulate materials to be fed into a pressurized process zone. The invention avoids the necessity of providing separate air lock equipment and associated dust collecting equipment.

BRIEF DISCLOSURE OF INVENTION

Our invention utilizes the sequential method steps of: fluidizing particulate material in a hopper or bin; flowing the fluidized material by gravitational force into a succession of horizontally rotated measuring pockets situated in the hopper throat region; uniformly densifying the flowed material in the measuring pockets by low-amplitude high-frequency vibration; successively striking excess material from each filled measuring pocket; rotating the pocket and measured material to a transfer chamber for delivery to a pressurized process zone; and injecting pressurized air into the transfer chamber to empty the measuring pocket of densified particulate material and deliver the emptied material into a process zone which has an operating pressure below the pressure of the injected delivery air. Material feeding rates are controlled by controlling the rate of rotation and emptying of the successive measuring pockets.

Suitable apparatus, including a closed but vented hopper, a rotating wheel means with successive measuring pockets positioned at the material hopper throat, material fluidizing means, high-frequency low-amplitude vibrating means coupled to the rotated measurement wheel, an excess material striking means cooperating with the rotated measurement wheel and filled pockets and having a delivery or transfer chamber, and a pressurized supply of delivery air, is provided for carrying out the method steps. Additionally, it may be desirable to couple the high frequency, low-amplitude vibrating means to the apparatus hopper in a novel manner.

BRIEF DESCRIPTION OF DRAWING

FIG. 1 is an elevational view of a preferred embodiment of the material feeding apparatus of our invention.

FIG. 2 is a plan view of the apparatus of FIG. 1.

FIG. 3 is an elevational view, partially in section, of a spring bias means detail included in the apparatus of FIGS. 1 and 2.

Figure 4:
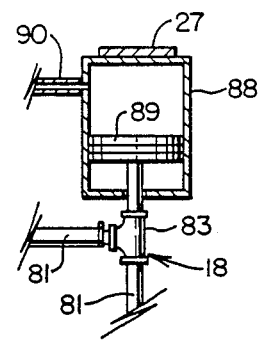
FIG. 4 is an elevational view, partially in section, of an alternate embodiment of bias means which may be utilized in the apparatus of FIGS. 1 and 2.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 7:
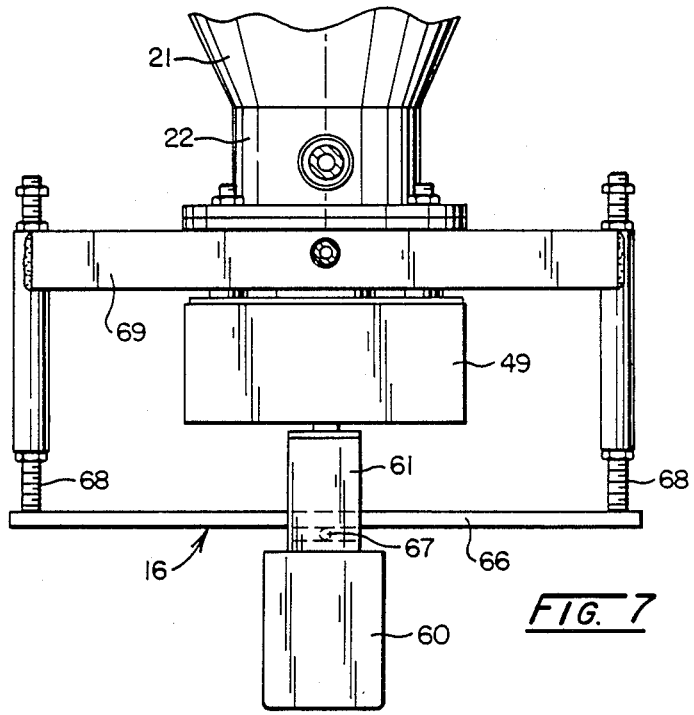
FIG. 7 is an elevational view of the vibrator means incorporated in this invention and taken at line 7—7 of FIG. 1.
Figure 8:
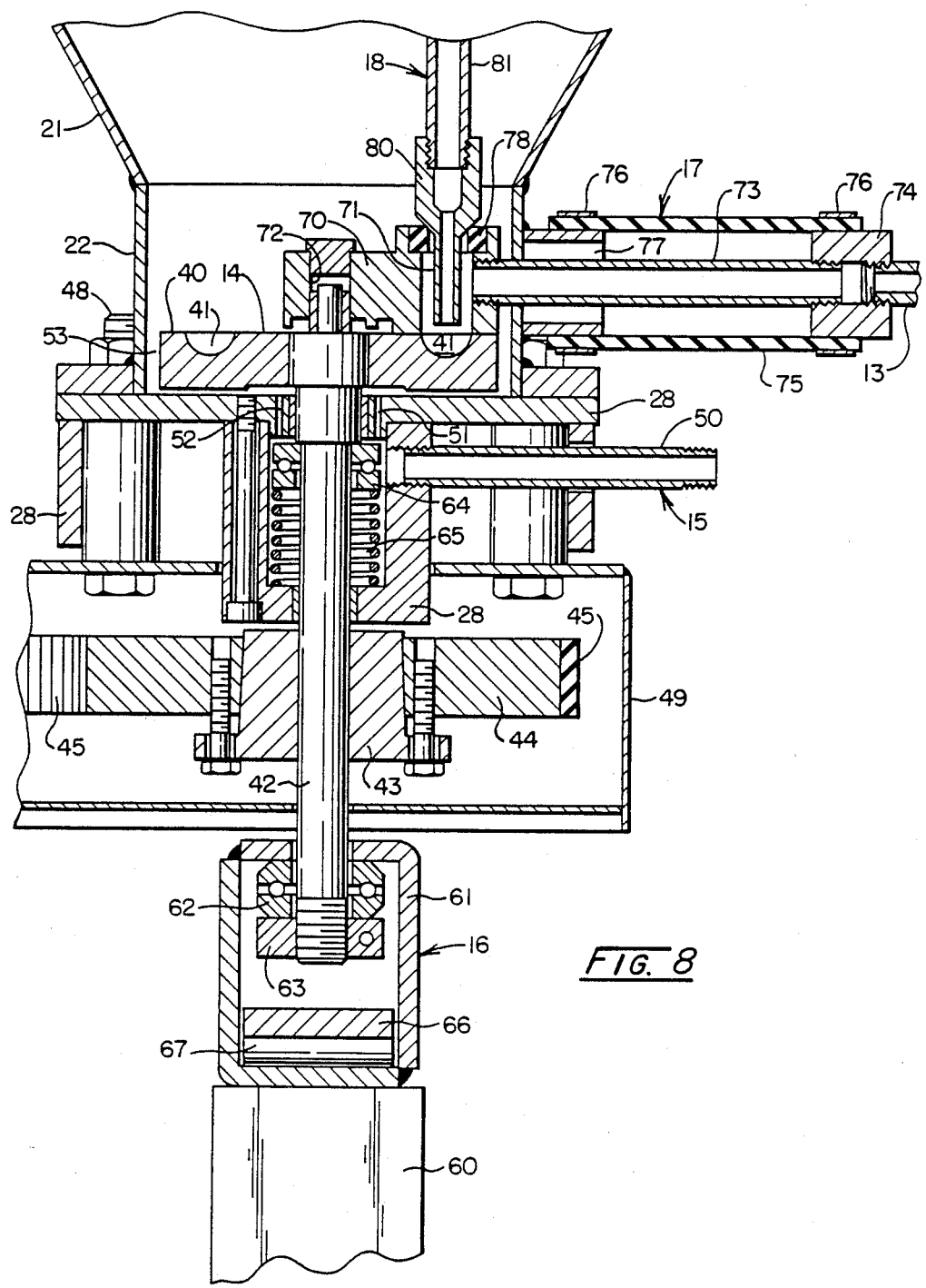
FIG. 8 is a sectional view taken at line 8—8 of FIG. 5.

A preferred embodiment of apparatus utilized in the practice of our invention is designated generally as 10 in the drawings. Such apparatus is utilized to feed contained particulate material through delivery line 13 into pressurized process zone 11. The principal subassemblies of apparatus 10 include a hopper subassembly 12, a rotating measurement wheel subassembly 14 (FIG. 8), a material fluidizing subassembly 15 (FIG. 8), a vibrator subassembly 16 (FIG. 7), a stator and transfer chamber subassembly 17 (FIG. 8), and a delivery air subassembly 18 (FIG. 8). In the descriptive material which follows, detailed information is provided only with respect to the significant components of the apparatus subassemblies which are necessary for an understanding of the complete functioning of the invention.

Hopper subassembly 12 is comprised of a cylindrical section 20, a conical section 21, a throat section 22, all joined together as by welding, and attached supporting legs 23. Subassembly 12 further includes a cover or lid 24 having a vent 25 and a filter paper screen 26 in the vent. If very high aeration gas pressures are utilized, it may be advantageous to vent the interior of hopper assembly 12 to process zone 11 rather than to the atmosphere. Subassembly 12 also includes an interior cross brace 27 which is utilized in developing reaction forces to maintain sliding contact as between a stator striking device 70 and the apparatus rotary measurement wheel subassembly 14.

Figure 5:
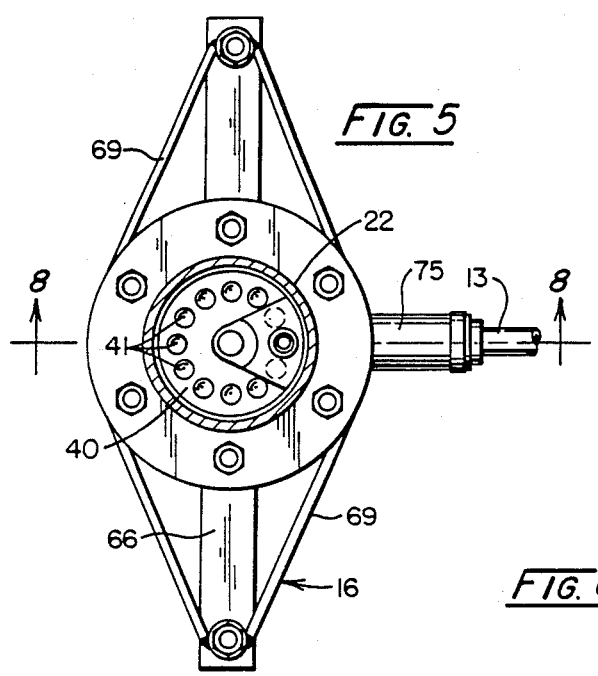
FIG. 5 is a sectional view taken at line 5—5 of FIG. 1.

Rotary measurement wheel subassembly 14 includes a horizontally-oriented pocket wheel 40 having a series of measurement pockets 41 situated in the packet wheel's upper surface (See FIG. 5). Packet wheel 40 is connected to drive shaft 42 and drive shaft 42 is in turn connected to attached hub 43. A pulley 44 cooperating with hub 43, a drive belt 45, and a drive pulley 46 function to connect the drive shaft to the shaft of gear motor 47. Gear motor 47 is secured to the belt guard 49 which is mounted to the hopper by bolts 48. Guard 49 surrounds the drive components for safety purpose.

In the operation of apparatus 10, it is important that compressed air be introduced into fluidizing subsystem 15 in order to properly aerate the particulate material contained in hopper assembly 12. Fluidizing subassembly 15 is principally comprised of inlet tube 50 connected to a pressurized or compressed air supply (not shown) and cooperates with passageways 51 and 52. Pressurized air introduced into inlet tube 50 flows around a hereinafter described thrust bearing 64, through passageways 51 and 52 radially under the lower surface of pocket wheel 40, and then through the annular passageway 53 between pocket wheel 40 and the hopper throat section 22. The compressed air flowing from the annular passageway between wheel 40 and throat section 22 of hopper subassembly 12 flows into the contained particulate material and causes that material to be aerated and flow like a low-viscosity liquid.

A conventional electro-magnetic vibrator means 60 is utilized in apparatus 10 to induce vibrational forces into drive shaft 42 and attached pocket wheel 40. Such forces are transmitted into the lower extreme of drive shaft 42 through yoke 61, thrust bearing 62, and the retainer collar 63 attached to the threaded lower extreme of the drive shaft. A drive shaft shoulder near the upper extreme of drive shaft 42 contacts thrust bearing 64. Bearing 64 in turn engages compression spring 65. Such additional components are contained within the removable housing 28 that closes the lower extreme of hopper throat section 22. A pre-load may be induced in compression spring 65 through load bar 66 and intermediate fulcrum 67. The pre-load may be induced by adjusting load screws 68 relative to support yoke 69 that is connected to housing assembly 28.

Feed apparatus 10 also includes a sector-shaped stator member 70 that functions to meter the quantities of powdered material contained in pockets 41 of pocket wheel 40 as pocket wheel 40 is rotated. Stator 70 has a transfer chamber 71 and also has a pivot bore 72 that functions to laterally restrain the inboard end of the stator member by slidably engaging an integral end of drive shaft 42. A rigid discharge tube 73 is connected to the outboard end of stator 70 and communicates with transfer chamber 71 and with delivery line 13 (FIG. 1). Stator 70 is permitted to "float" relative to hopper throat section 22 through the resilient connection comprised of outlet bushing 74, flexible hose 75, and hose clamps 76 that cooperate with bushing 74 and the stub outlet designated 77. A resilient seal 78 is provided in a recess in stator 70 and cooperates with a nozzle portion of delivery air subassembly 18. During operation of the system, stator 70 is maintained in sliding contact with pocket wheel 40 through reaction forces or bias developed in delivery air system 18 and transmitted through resilient seal 78.

Delivery air subassembly 18 includes a nozzle 80 that is projected within transfer chamber 71 and that is connected to the pressurized air supply lines designated 81. Lines 81 are connected to an air supply inlet 82, and that air supply inlet is connected to a source of compressed air (not shown) at a pressure above the pressure in process zone 11. Nozzle 80 is urged against resilient seal 78 in most applications by reaction forces applied to air supply lines 81.

Two different arrangements for developing a reaction force to maintain stator 70 in sliding contact with pocket wheel 40 are illustrated in FIGS. 3 and 4 of the drawings.

Referring to FIG. 3, a threaded stem 83 cooperates with the fitting 84 which joins horizontal and vertical air supply lines 81. Threaded stem 83 passes through an opening in crossbrace 27 and also cooperates with a compression spring 85, a washer 86, and adjustment nut 87. Location of adjustment nut 87 relative to stem 83 varies the compression induced in spring means 85. A reaction force developed by the cooperation of spring 85 and crossbrace 27 is transmitted through the various components into vertical supply line 81, nozzle 80, resilient seal 78, and into stator 70. Thus, the sliding contact relationship between stator 70 and pocket wheel 40 is assured at all times during operation of the assembly.

In the FIG. 4 arrangement for developing a reaction force, an actuator comprised of cylinder 88 and piston 89 is substituted for the compression spring 85. The upper interior of cylinder 88 communicates with the pressurized process zone 11 through line 90. Thus, any increase in pressure in process zone 11 that would be communicated through delivery tube 13 and into annular chamber 71 so as to increase the separation between stator 70 and pocket wheel 40 would also be transmitted by means of line 90 into the chamber above piston 89 thereby increasing the reaction force transmitted into line 81 and on to nozzle 80.

Figure 6:
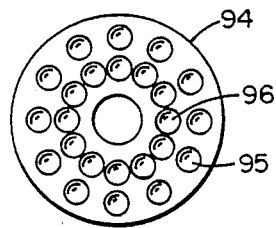
FIG. 6 is a plan view of an alternate pocket wheel means which may be utilized in the practice of this invention.

Other modifications might be made to apparatus 10 in order to change system capabilities for different applications. For instance, it is possible to configure apparatus according to our invention to deliver particulate material to two or more processing zones at the same time. Such modifications would depend primarily upon the diameter of pocket wheel 40 at the hopper throat section and the feasibility of incorporating two or more stator and delivery outlet arrangements in the apparatus plan. FIG. 6 illustrates a pocket wheel 94 having two generally annular rows of measuring pockets designated 95 and 96.

Still other configurations of feed apparatus 10 are possible. For instance, a multiple stators arrangement cooperating with a single row of wheel pockets is feasible if there is sufficient spacing between the stators to allow complete refilling of the pockets.

In preparing apparatus 10 for operation, it is necessary that an air supply be connected to inlet tube 50 to deliver air at a pressure slightly above the pressure in the upper region of hopper 12, that inlet 82 be connected to a supply of pressurized air at a pressure greater than the pressure in process zone 11, and that drive motor 97 be connected to a suitable controller. It is also necessary to connect vibrator 60 to a suitable electrical supply and control switch.

Particulate material is flowed by gravity from hopper 21 into throat section 22 and is aerated there by air flowing into inlet tube 50, through passageways 51 and 52, and through annular passageway 53 around the edge of pocket wheel 40. The pressurized air aerates the particulate material and causes it to flow much in the manner of a low-viscosity fluid. Simultaneously, vibrator 60 is actuated and causes vibrating wheel 40 to oscillate in a vertical direction through a small frequency amplitude and at a high frequency. In one specific embodiment of our invention, we operated vibrator means 60 at 1800 cycles per minute and through amplitude in the range of from 0.005 inches to 0.010 inches amplitude. As pocket wheel 40 is vibrated, any material contained in individual pockets 41 is uniformly densified. As pocket wheel 40 is rotated, the individual pockets pass under stator 70 and since stator 70 and pocket wheel 40 remain in sliding contact with each other, all excess material from each individual pocket is excluded from transfer to transfer chamber 71. As the individual pockets are brought into alignment with transfer chamber 71, the delivery air provided to inlet 82 is transmitted onto nozzle 80 and forces the material in pocket 41 into the transfer chamber and out of the apparatus through delivery tubes 73 and 13.

It will be apparent to those skilled in the art from the foregoing that numerous improvements and changes can be made in the embodiments described of the invention without departing from the true scope of the invention. Accordingly, the foregoing disclosure is to be construed as illustrative and not in a limiting sense with the scope of the invention being defined solely by the appended claims.

We claim:

1. In a material handling system for feeding particulate material from a hopper into a process stream at a controlled flow rate, apparatus comprising:
   (a) a rotating wheel means having a flat upper surface with spaced-apart pockets that receive particulate material from the hopper by gravitational flow;
   (b) stator means contacting and covering a portion of said upper surface of said wheel means and having a transfer chamber with a connecting passageway that communicates with discharge means for discharging the material to the process stream;
   (c) drive means for continuously rotating said wheel means relative to said stator means at a controlled rate of rotation;
   (d) a conveying gas supply means projecting a jet of gas through said transfer chamber of said stator means, said jet of gas being thrust into successive of said surface pockets as said wheel means is rotated to thereby remove particulate material from said pockets and convey the particulate material with the flow of gas into said transfer chamber of said stator means and through said discharge means into the process stream; and
   (e) a vibrator means connected to the wheel means for vibrating the wheel means and stator means together in the vertical direction to densify the particulate material in the pockets of the wheel means.

2. The invention defined by claim 1 wherein the hopper is provided with an aerating gas supply means, said aerating gas supply means directing an upward flow of gas through the particulate material in the hopper above said wheel means to facilitate the gravitational flow of particulate material into said spaced-apart wheel pockets.

3. The invention defined by claim 1 wherein a pressure of the process stream is greater than a pressure within the hopper.

4. The invention defined by claim 1 wherein said stator means is urged downwardly by a bias force, said bias force maintaining said stator means in continuous sliding contact with said wheel means upper surface as said wheel means is rotated by said drive means and reciprocated vertically by said vibrator means.

5. The invention defined by claim 4 wherein said bias force is developed by a spring means, said spring means acting against the hopper.

6. The invention defined by claim 4 wherein said bias force is developed by actuator means, said actuator means being responsive to an internal pressure of the process stream and acting against the hopper.

7. The invention defined by claim 1 wherein said conveying gas supply means comprises nozzle means; said nozzle means projecting into said transfer chamber of said stator means to within a small distance above said upper surface of said wheel means, said nozzle means directing pressurized conveying gas into successive of said pockets and into an annular passageway in the transfer chamber partially defined by the exterior of said nozzle means.

8. The invention defined by claim 7 wherein said pockets of said wheel means are each substantially hemispherical.

9. The invention defined by claim 7 wherein said vibrator means has an oscillating amplitude in the range of 0.005 inch to 0.010 inch.

10. The invention defined by claim 1 wherein multiple of said conveying gas supply means, stator means, and discharge means are provided, said discharge means being spaced and positioned with respect to said wheel means and said wheel means pockets to form multiple discharge streams of particulate material from the hopper into separate process streams.

11. A method of continuously feeding particulate material from within a hopper into a process stream by successively measuring discrete volumes of the particulate material, comprising the steps of:
   (a) flowing a gas into the particulate material within the hopper to aerate particulate material prior to measurement and effecting a free falling, gravitational flow of particulate material from the hopper into spaced pocket indentations of a moving receptacle;
   (b) striking and capping the particulate material in successive pocket indentations to measure discrete volumes of densified particulate material corresponding to the volumes of the pocket indentations;
   (c) discharging the measured discrete volumes of particulate material successively from the spaced pocket indentations into the process stream; and
   (d) continuously vibrating in a vertical direction the moving receptacle through an amplitude and frequency sufficient to de-aerate and densify the particulate material which has flowed into the pocket indentations by gravity.

12. The method defined by claim 11 wherein said amplitude of vibration is in the range of 0.005 inch to 0.10 inch.

13. The invention defined by claim 11 wherein the discharging of measured volumes of particulate material is accomplished by a flow of gas.

14. The invention defined by claim 11 wherein a pressure of the process stream is greater than a pressure within the hopper.

15. The invention defined by claim 11 wherein the particulate material discharged from the spaced pocket indentations is discharged into multiple process streams.

* * * * *